Aug. 9, 1938.   F. W. SCHWINN   2,126,222
METAL WHEEL RIM
Filed July 8, 1936
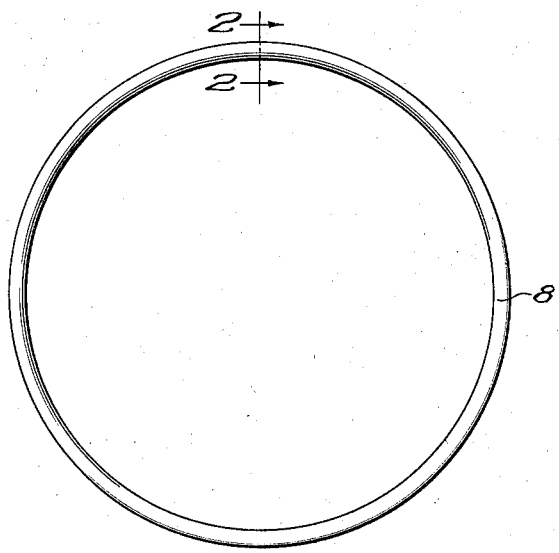
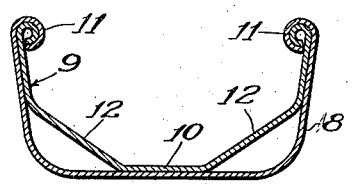
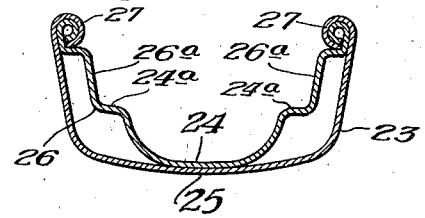
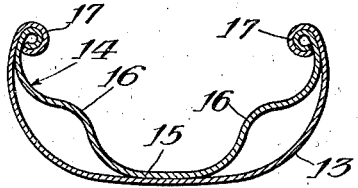
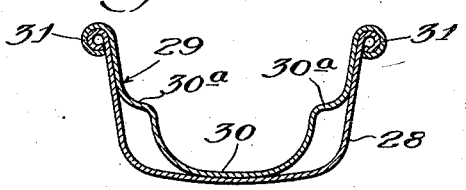
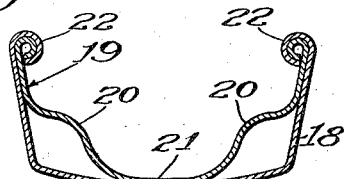
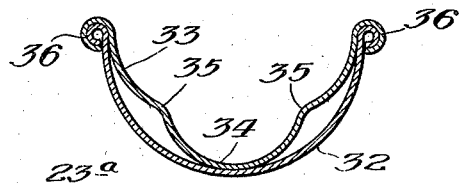
Inventor:
Frank W. Schwinn,
By Dyrenforth, Lee, Chritton & Wiles
Attorneys Patented Aug. 9, 1938

2,126,222

UNITED STATES PATENT OFFICE 2,126,222

METAL WHEEL RIM

Frank W. Schwinn, Chicago, Ill.

Application July 8, 1936, Serial No. 89,621

2 Claims. (Cl. 301—97)

My invention relates generally to metal wheel rims, but more particularly to rims of cycle wheels which it is desired be of relatively light weight and still possess a high degree of strength.

My object is to provide for the production of metal wheel rims which, while being relatively light in weight, shall possess a high degree of strength and which may be economically manufactured.

Referring to the accompanying drawing:

Figure 1 is a side view of a rim constructed in accordance with my invention.

Figures 2, 3 and 4 are enlarged cross-sectional views of three different forms of rims shown as of types suitable for use with tires of the clincher, semi-clincher or hook type and constituting some of the forms in which my invention may be embodied.

Figures 5, 6 and 8 are enlarged cross-sectional views of certain other forms of construction suitable for use with tires of the straight side type constituting other forms in which my invention may be embodied; and Figure 7, a similar view of a construction suitable for use with a single tube tire and embodying the invention.

In accordance with my invention the rim is formed of separate strips of metal deformed, as for example by a rolling operation, to provide radially inner and outer nested rim sections of channel shape secured together at their circumferential edge portions and bent longitudinally, as by a rolling operation, into circular form with their adjacent ends secured together, preferably by a welding operation, to retain the structure in circular form, one of the sections, preferably the radially outer one, being so formed as to provide strengthening annular brace portions reinforcing the rim structure against the stresses to which it is subjected in use and thereby augmenting its stiffness.

Referring to the construction shown in Fig. 2 the radially inner rim section, represented at 8, is of general U-shape channel form in cross-section and the radially outer section, represented at 9, and nested in the section 8, of general channel form in cross-section having a medial portion 10 between its sides which bears against the adjacent portion of the rim section 8.

The rim sections separately formed into the cross-sectional shape shown in Fig. 2, except that the sides of each are continued in the planes of the straight portions of its sides, are, in accordance with one way of forming the rim, secured together after the nesting of one section within the other as stated, along their circumferential lapping edges as for example as shown by bending these circumferential portions upon themselves inwardly, as by a rolling operation, to form beads 11 projecting inwardly of the sides of the rim-section and located at the outer edges of the portions 9. The rim-section assembly is then bent longitudinally into circular form, as for example by initially bending the assembly into a spiral and cutting to the length required for the desired diameter of rim in accordance with well known practice of manufacturing metal rims, and its meeting ends secured together as for example by a welding operation, to form the rim as shown in Fig. 1, the beads referred to, and which extend circumferentially about the rim, serving as circular stops or abutments for interlocking with the clincher beads of tires, and the circular portions of the radially outer rim section 9 at opposite sides of the medial portion 10 and represented at 12 being spaced from the opposing portions of the radially inner rim section and cooperating therewith to form reinforcing bracing for the rim.

The construction shown in Fig. 3 carries out the same idea as in the construction shown in Fig. 2 but varies therefrom in the cross-sectional shape of the rim, the radially inner rim section, herein represented at 13, being of substantially curved form in cross-section with its sides slightly inwardly curved and the radially outer rim section represented at 14 being of general reverse curved form in cross-section to provide an annular medial portion 15 which bears against the adjacent portion of the rim section 13, and outwardly bowed annular portions 16 which perform the bracing function, the bead portions of the rim being shown at 17.

Likewise the structure of Fig. 4 follows substantially the same idea as is embodied in the construction shown in Fig. 2 its radially inner rim section, shown at 18, being more nearly of angle shape in cross section and its radially outer rim section, shown at 19, being reversely curved in cross section, as represented at 20, at opposite sides of the medial portion 21 of the section 19 at which this section bears against the adjacent portion of the section 18, to form annular portions functioning to perform the bracing function, the bead portions of the rim being shown at 22.

The construction of Fig. 5 provided for use with a tire of the straight-side type also follows the same general idea as underlies the construction shown in Fig. 2 the radially inner rim section, represented at 23, being of the same general form in cross section as the radially inner rim section 18 of Fig. 4 and its radially outer rim section, represented at 24, of the same general form in cross-section as the radially outer rim section 19 of Fig. 4, except that the upper edges of its side walls adjacent the bead portions herein represented at 27 are inset from the adjacent portions of the side walls of the rim section 23, as represented at 26ª, to contact with the side surfaces of a straight-side tire (not shown) when applied thereto, the medial portion of the radially outer rim section 24 which bears against the adjacent portion of the radially inner rim section 23 being represented at 25 and its bracing portions at 26. The annular portions 24ª form shelves upon which the tire seats.

The construction of rim shown in Fig. 6 also provided for use with a tire of the straight-side type also follows the same general idea underlying the construction shown in Fig. 2, its radially inner rim section, represented at 28, being of substantially the same cross-sectional shape as the radially inner rim section 8 of Fig. 2 and its radially outer rim section, represented at 29 being of a shape in cross-section approximating that of the radially outer rim section 19 of Fig. 4, except that its reverse curved portions at opposite sides of the annular medial portion 30 of the radially outer section at which it bears against the rim-section 28, and which perform the bracing function, are somewhat more sharply curved, the bead portions of the rim and which turn outwardly in this construction being represented at 31 and the annular shelves for the tire at 30ª.

The construction of rim shown in Fig. 7 provided for use with a single tube tire follows out the underlying idea of the construction shown in Fig. 2. In this construction the radially inner rim section shown at 32 is of substantially arcuate form in cross-section, and its radially outer rim section represented at 33 is of reverse curved form in cross-section affording an annular medial portion 34 which bears against the adjacent portion of the radially inner rim section 32 and spaced bracing portions 35 at opposite sides thereof, the beads of the rim represented at 36 extending outwardly as in the case of the construction of Fig. 6.

The construction shown in Fig. 8 is substantially the same as that shown in Fig. 5 except that the inturned marginal edges of the side walls of the radially inner rim section 23 instead of curving outwardly at their terminal portions extend downwardly generally in the plane of the portions 26ª of the outer rim section 24, as represented at 23ª.

As will be understood from the foregoing the making of the rim of two separate nested channel members connected together at their circumferential edge portions, permits of the use of the making of the radially outer rim section, which is unexposed to view when the tire is applied to the rim, of metal of a gauge greater, and of a grade cheaper, than that used for the radially inner rim section which should be of a good grade, such as for example stainless steel, to render it suitable for plating, though it is not to be understood that the invention is limited to a structure in which the radially outer rim section is heavier, or of cheaper metal, than the inner section.

Furthermore, as will be noted, a rim constructed in accordance with my invention presents the advantage of omission of any joint or seam along the medial line of the rim.

If desired, other procedures in the production of the rim may be followed. Thus, by way of example, instead of securing the rim sections together at their circumferential lapping portions before longitudinally bending the rim-section assembly into curved form, the securing operation referred to may be effected, as by a rolling operation, simultaneously, with the longitudinal bending of the rim-section assembly into curved form.

While I have illustrated and described certain particular forms of structure embodying my invention and described certain procedures in the production of the rims I do not wish to be understood as intending to limit it thereto as the structures shown and procedures described may be variously modified and altered and the invention embodied in other forms of structure without departing from the spirit of my invention.

What I claim as new and desire to secure by Letters Patent, is:

1. A wheel rim comprising separate metal channel-like radially inner and radially outer sections the circumferential lapping edge portions of the side walls thereof being bent upon themselves to form inwardly-extending beads securing said sections together, the radially outer one of said sections having inwardly offset substantially radial portions adjacent said beads, and substantially flush with the inner surfaces of said beads to engage the side-surfaces of a straight side tire applied to the rim.

2. A wheel rim comprising separate metal channel-like radially inner and radially outer sections the circumferential lapping edge portions of the side walls thereof being bent upon themselves to form inwardly-extending beads securing said sections together, the radially outer one of said sections having inwardly offset substantially radial portions adjacent said beads and substantially flush with the inner surfaces of said beads to engage the side-surfaces of a straight side tire applied to the rim and shelves for the inner marginal edges of the tire.

FRANK W. SCHWINN.